United States Patent [19]
Caragliano et al.

[11] 3,943,283
[45] Mar. 9, 1976

[54] BIDIRECTIONAL SINGLE WIRE DATA TRANSMISSION AND WRAP CONTROL

[75] Inventors: Edward S. Caragliano; Howard H. Nick, both of Poughkeepsie, N.Y.

[73] Assignee: International Business Machines Corporation, Armonk, N.Y.

[22] Filed: June 17, 1974

[21] Appl. No.: 479,935

[52] U.S. Cl............................ 178/58 R; 179/15 AL
[51] Int. Cl.²........................................... H04L 5/14
[58] Field of Search...... 179/15 AL, 170 R; 178/68, 178/58, 59, 70 R, 71 R; 333/10

[56] References Cited
UNITED STATES PATENTS

| | | | |
|---|---|---|---|
| 3,214,734 | 10/1965 | Whitehead | 179/15 AL |
| 3,519,743 | 7/1970 | Herter | 178/58 R |
| 3,601,806 | 8/1971 | Heimbigner | 179/15 AL |
| 3,619,504 | 11/1971 | DeVeer et al. | 178/58 R |
| 3,725,582 | 4/1973 | Davis | 178/58 R |
| 3,775,561 | 11/1973 | Guckel | 178/58 R |
| 3,786,418 | 1/1974 | Nick | 179/15 AL |
| 3,786,419 | 1/1974 | Nick | 179/15 AL |
| 3,862,364 | 1/1975 | Inose et al. | 178/59 |

Primary Examiner—Thomas A. Robinson
Attorney, Agent, or Firm—Harold H. Sweeney, Jr.

[57] ABSTRACT

A data communication system is provided in which the data handling capacity of the system is doubled. The data in the system travels on a single wire in both directions simultaneously. Each pair of terminals associated with the communication system is interfaced with the single wire by a repeater. The repeater includes first and second directional couplers for coupling data signals from the repeater to the wire in the one direction and in the opposite direction, respectively, without substantial signal interference with signals being received by the repeater on the same wire. A wrap control function is included in the repeater which allows data signals to be placed on the wire going in the opposite direction from the received signals.

9 Claims, 5 Drawing Figures

BIDIRECTIONAL SINGLE WIRE DATA TRANSMISSION AND WRAP CONTROL

FIELD OF THE INVENTION

The invention relates to a data communication system and, more particularly, to a data communication system in which directional couplers are utilized to provide communications in both directions on a single line simultaneously, thereby doubling the data handling capacity of the system and providing an improved wrap control.

DESCRIPTION OF THE PRIOR ART

Loop data communications systems are known in which the information is generated at the host unit and transmitted along a single primary line to a repeater associated with a particular terminal. The wire continues from repeater to repeater and closes the loop back to the host unit. The information signals generated at the host unit are transmitted along the wire to a receiver in the respective repeater where it is amplified and re-transmitted onto the cable through a driver. Of course, the information can be updated, changed or new information inserted at the respective terminal. The prior art also has a feature commonly known as a wrap function, which generally requires two wires between the host and each of the terminals for operation. The host unit interrogates each of the repeaters, that is, it sends a message to the repeater requesting a return message. If the repeater does not respond, the host proceeds as if the line is broken and signals the next previous repeater to go into the wrap function. This consists essentially of re-directing the received signals, at the repeater, to a driver and to a coupling means which places the information signals onto the secondary cable for transmission back toward the host. Each repeater contains a wrap control unit for directing the incoming information signals to the wrap driver or to the normal driver in accordance with the signal received from the host unit.

In a single wire data transmission system, where the information is transmitted in one direction only, transformers can be used to perform the coupling. However, in a data transmission system wherein the data is traveling simultaneously in both directions on a single line, the transformer would not be suitable. For example, the transformer would couple the input signal energy from the primary to the secondary and split the energy so that half goes in the desired direction and half goes in the non-desired direction. The incoming signals on the same wire would be interfered with by the portion of the signal transmitted along the line in the non-desired direction. U.S. Pat. No. 3,612,781 shows a circuit which permits the simultaneous transmission of data in two directions on a common transmission line. This circuit includes, at each location, a differential amplifier with two inputs, the one input receiving data to be transmitted onto the line from the particular location and, the other input receiving both the data being transmitted onto the line from the location and the data being received on the line at the location. The two inputs are isolated from each other so that the output of the differential amplifier, which goes to the location receiver, is a function only of the data received on the line at the location. It can be seen that this type of operation requires a complicated circuit to obtain a single wire bidirectional system.

SUMMARY OF THE INVENTION

Briefly, the invention consists of a data communications system having a host unit and a plurality of terminals connected to a single transmission wire wherein the data is placed on the wire traveling in opposite directions simultaneously. A plurality of repeater means each interfacing a pair of the terminals with the wire, are adapted to receive and regenerate data from either direction, to distribute the data to at least one of the pair of terminals and to couple data from the terminals to the transmission wire. The repeater includes a first directional coupler for coupling data signals from the repeater to the transmission wire in one direction without interfering with the data travelling on the wire in the opposite direction and a second directional coupler for coupling data signals from the repeater to the transmission wire in the other direction without interfering with the data travelling on the wire in the opposite direction, whereby data signals can be conveyed via the same communication medium in the opposite directions simultaneously, thus doubling the data capacity of the communications system.

It is a further feature of the data communications system to include in the repeater a wrap control unit which when properly signaled routes the received data signals to both of said pair of terminals and routes the data signals received from the terminals back onto the transmission medium in the opposite direction from the received data signals via the respective first and second directional couplers.

Accordingly, it is the main object of the present invention to double the data transmission capacity of a data communication system without increasing the number of transmission wires.

It is another object of the present invention to provide a data communication system in which the data can be transmitted on a single wire in both directions simultaneously.

It is another object of the present invention to provide a data communications system in which directional couplers are used in the repeaters at each of the stations to place the data onto the wire in the desired direction without substantial interference with the incoming opposite direction signals.

It is a further object of the present invention to provide a data communication system in which an improved wrap control function is provided to put the information back on the wire in the opposite direction from the direction of the received signal.

The foregoing and other objects, features and advantages of the invention will be apparent from the following more particular description of an embodiment of the invention as illustrated in the accompanying drawings.

DESCRIPTION OF THE PREFERRED EMBODIMENT

Figure 1:
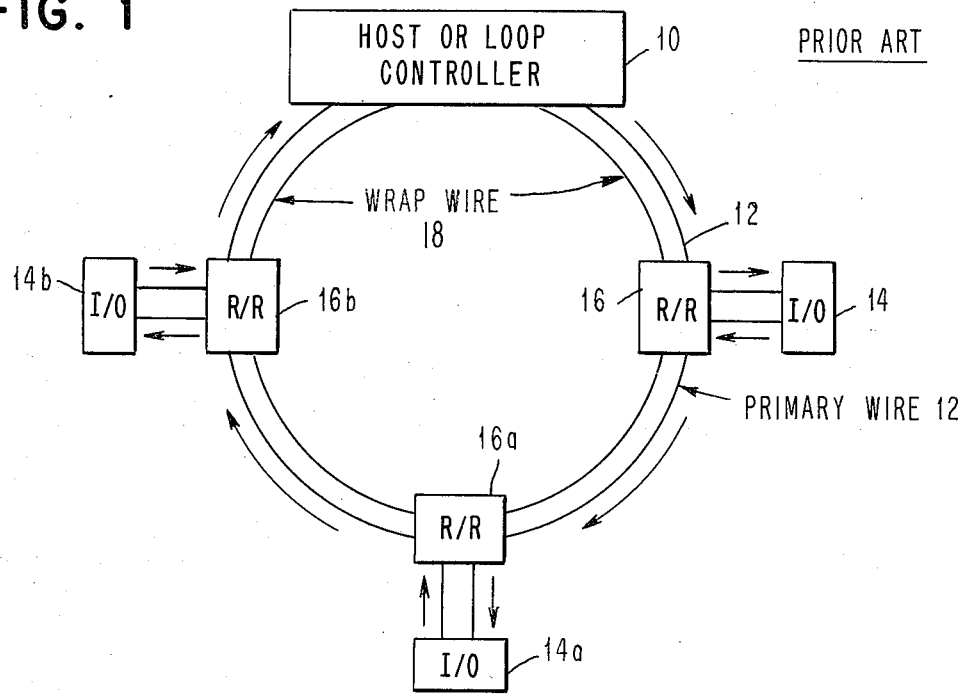
FIG. 1 is a schematic diagram which shows a prior art data communications system loop having clock-wise data transmission and an auxiliary wire used to implement the wrap function.

Referring to FIG. 1, there is shown the conventional prior art data communication system in the form of a closed loop wherein a host or loop controller 10 provides the information which is applied to the transmission line 12 in a clockwise direction. A number of stations are located along the transmission lines in the form of input/output devices 14–14b such as terminals, tape machines, etc. Each input/output device receives information from and places information onto the transmission line 12 through an interfacing regenerative repeater 16–16b. Each input/output device located along the transmission loop communicates with the host loop controller 10. In addition to the single communication channel 12 shown, an auxiliary wire 18 is associated with the loop to implement a wrap function. The wrap function is initiated by the host unit 10 which interrogates the I/O devices 14–14b requesting a response. This is done serially so that if a response is not received the next preceding station can be signaled to go into the wrap mode. This mode consists essentially of re-routing received and processed information back to the host unit via the auxiliary wire 18. The wrap function only takes place when there is a break in the line subsequent to the particular I/O device or station signaled into the wrap mode. Utilizing this method of interrogating successive I/O devices along the transmission loop, a break in the transmission loop can be located.

Figure 2:
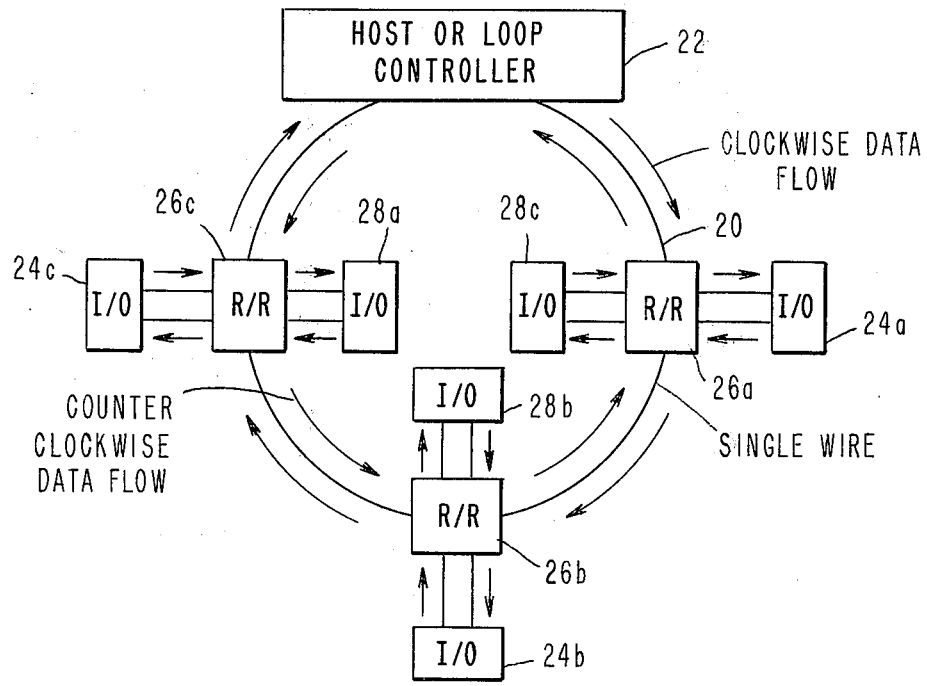
FIG. 2 is a schematic diagram which shows a data transmission loop in which the data capacity has been doubled by providing a bidirectional communication capability.

Referring to FIG. 2, there is shown a data transmission system in the form of a loop wherein the data transmission is bidirectional on a single wire 20, so that the capacity of the system with respect to data handling is effectively doubled. The host or loop controller 22 places information onto the data transmission wire 20 in both directions. That is, the data is placed on the transmission line 20 going in a clockwise direction as shown by the appropriate arrow, and also data information is placed on the transmission line going in the counter-clockwise direction as shown by the appropriate arrows. The host or loop controller 22 is a computer and the various input/output devices 24a–24c connected thereto are generally terminals by means of which the access to the computer is obtained. The data placed onto the wire 20 by the host 22 in the clockwise direction is received by the first regenerative repeater 26a. The input/output device 24a is predetermined to be operable with the regenerative repeater in response to data received in the clockwise direction. The information, subsequent to the operation thereon in the first clockwise repeater 26a and I/O device 24a, is sent to the second regenerative repeater 26b and associated I/O device 24b along the loop in the clockwise direction. This sequence extends to each of the regenerative repeaters and associated input/output devices along the loop until the information is again received in the host computer 22. Similarly, information signals are placed on the cable 20 by the host unit 22 travelling in the counter-clockwise direction. These information signals are completely separate from the previous information signals traveling in the clockwise direction and can be at a completely different data rate. This information travels on the same wire 20 in the counter-clockwise direction to the first regenerative repeater 26c in the counter-clockwise direction and its associated input/output device 28a. It should be noted that the input/output device 28a is selected as the input/output device within the loop for the counter-clockwise traveling signals. The information is received and acted upon in this regenerative repeater 26c and I/O device 28a and transmitted onto the next repeater 26b and associated I/O device 28b in the loop. This continues around the loop in the counter-clockwise direction until the data signals are again received in the host unit 22. It will be appreciated that there are really two communications loops, one in the clockwise direction and one in the counter-clockwise direction. The important thing to note is that they utilize the same wire. Another way of looking at the invention is that the data handling capacity of the loop has essentially been doubled. This improvement in the data communication system will require some changes in the regenerative repeaters 26a–26c to be able to handle information simultaneously in both directions without interference.

Figure 3:
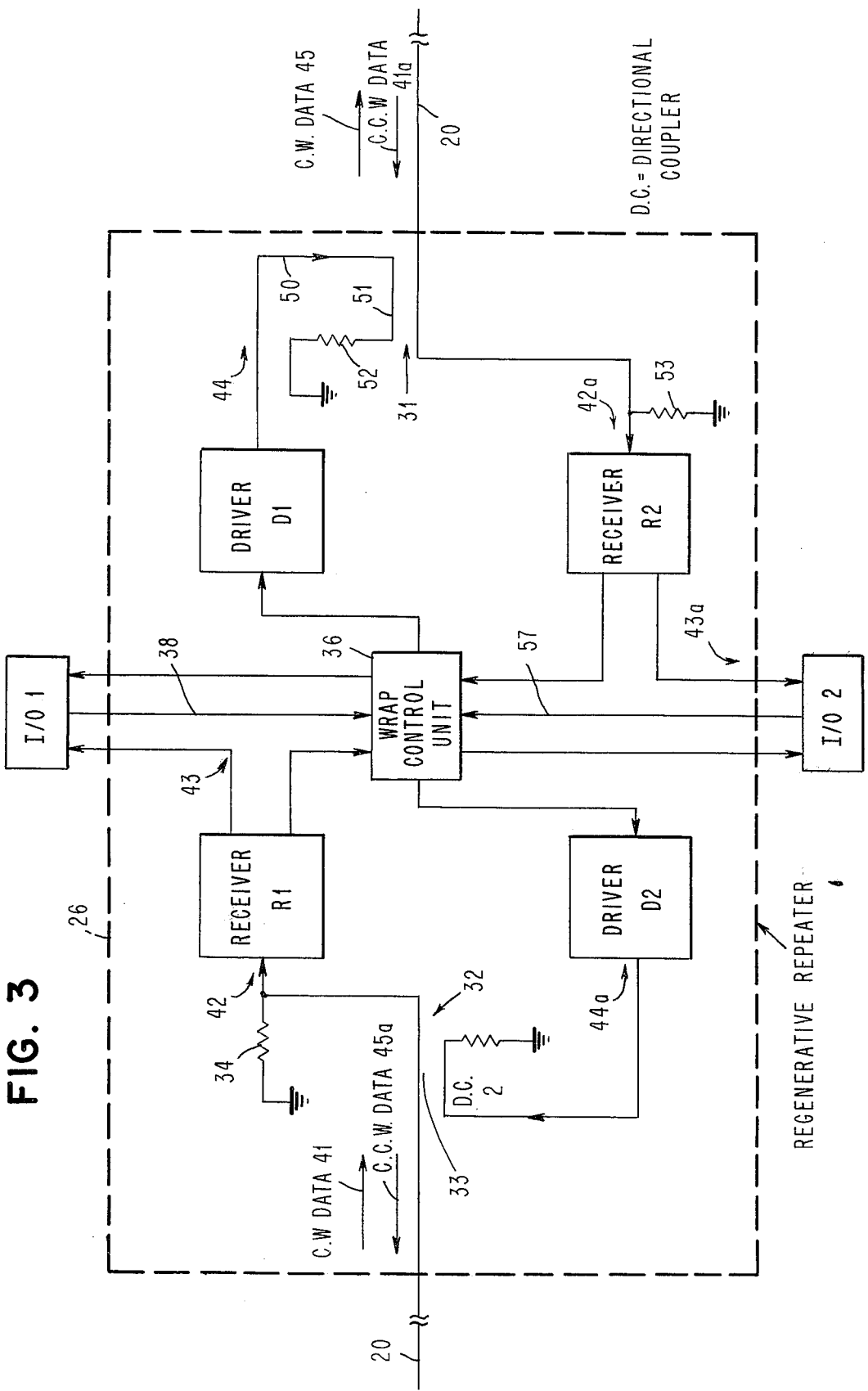
FIG. 3 is a block diagram showing further details of the regenerative repeater of FIG. 2.

The regenerative repeater, shown in more detail in FIG. 3, contains a pair of directional couplers 31, 32 for placing the information onto the line 20 going in the appropriate direction respectively. The important feature of the directional couplers 31, 32 in the application is that the signals can be coupled onto the line 20 going in the desired direction without a substantial signal being generated in the other direction on the line to interfere with the signal being transmitted along the line in that same direction. These directional couplers are the strip line variety which consist essentially of two parallel adjacent printed circuit strip lines sandwiched between two ground planes which are inductively and capacitively coupled so that the edges of a first pulse, of fast rise and fall time characteristics, propagating along one line, produce a positive pulse and a negative pulse in the other line. The lines are back coupled or directional in that the thus produced pulses propagate along the second line in a direction opposite to the direction in which the first pulse propagates along the first line. The energy transferred between the coupling segments of the two element directional coupler is affected by the various physical characteristics of the directional coupler such as the length, width and distance between the coupling segments.

Figure 4:
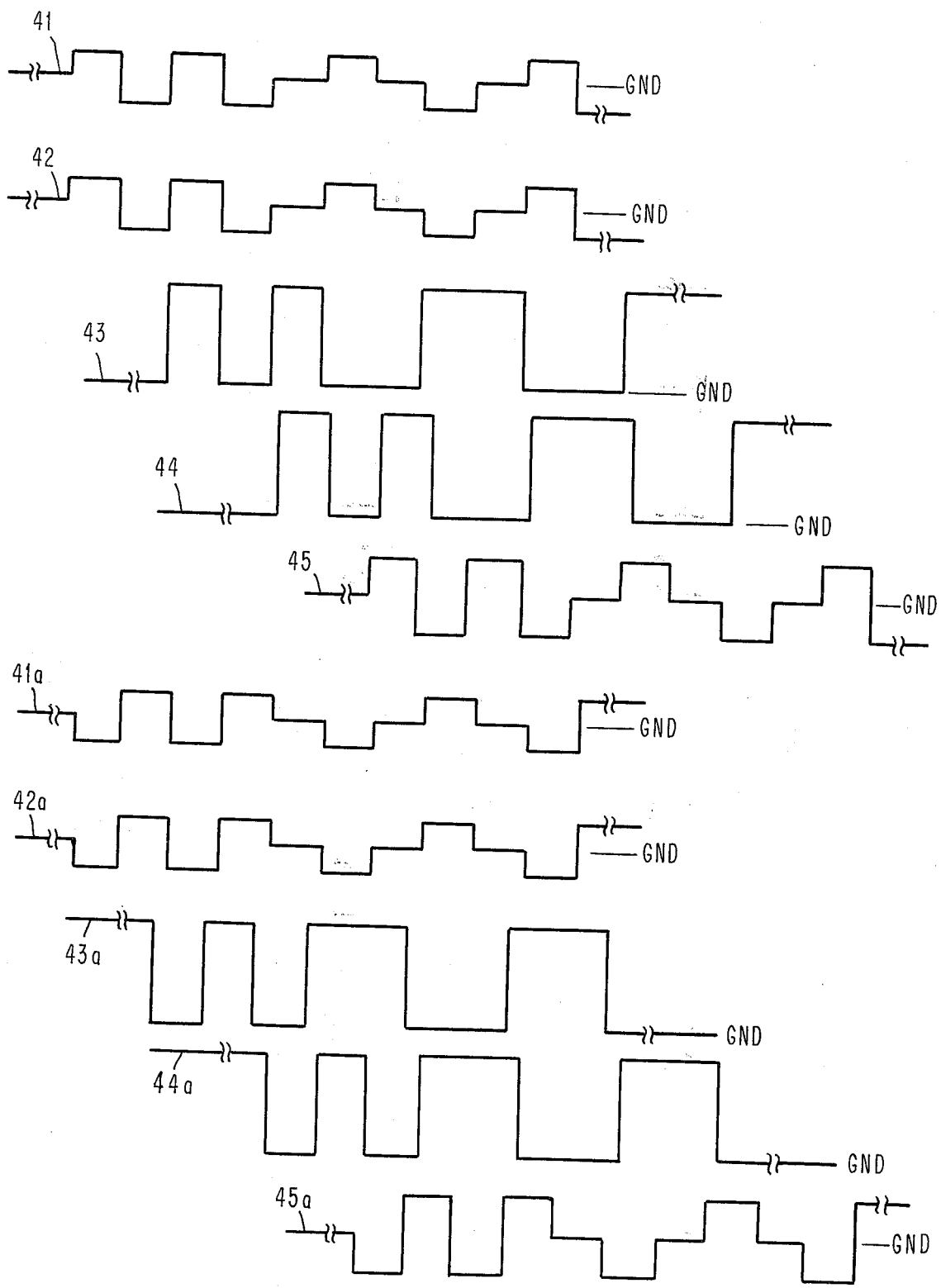
FIG. 4 is a schematic diagram showing the various wave forms associated with FIG. 3.

In FIG. 3, the wire 20 is shown connected into the regenerative repeater 26 at both sides thereof, the one side receiving the information signals traveling in the clockwise direction while the other side receives the counter-clockwise data signals as indicated by the designated arrows. The wave form of the data is shown in data wave form 41 of FIG. 4. Actually the wave form 41 is the wave form that is placed onto the wire after passing through a directional coupler. This wave form results from an original bi-frequency wave, where for example, a complete cycle starting with a positive phase represents a "1" bit of information and a complete cycle starting with a negative phase represents a "0" information bit. This data is received by the next regenerative repeater in the clockwise direction and is connected to receiver R1. It should be noted that the incoming clockwise traveling data received at any regenerative repeater represented by regenerative repeater 26 of FIG. 3 passes along element 33 of the directional coupler 32. A resistor 34 is connected at the input to the receiver R1 to ground and has a sufficient value to provide an impedance equal to the characteristic impedance of the transmission line 20. The wave form 42, shown in FIG. 4, at the input of receiver R1 is exactly the same as the wave form 41 received at the regenerative repeater 26. This indicates that the directional coupler 32 connected to the line 20 and the termination resistor 34 have no substantial effect on the information signals received at the receiver R1. Of course, there will be coupling of the incoming information through the directional coupler 32 which information couples through the coupler in the opposite direction. Thus, the coupled signal will be traveling towards driver D2. However, this signal is relatively small in comparison to the signal being driven by driver D2 onto the wire through the directional coupler 32. The information, after passing through receiver R1, which is a receiver latch and amplifier combination, is transformed back to the bi-frequency code originally generated by the host unit. In other words, the wave form that results from the receiver R1 is substantially the same as the wave form prior to passing through a directional coupler. The details of a receiver and driver suitable for use in this invention are described in connection with the repeater shown in the publication "Transmission Systems for Communications" revised fourth edition December 1971 published by Western Electric Co., Inc. Technical Publications, Winston Salem, N.C. The receiver R1 latch operates upon receipt of a positive pulse with reference to ground such as wave form 42 to produce a positive level with respect to ground as seen in wave form 43. This level is maintained until a negative pulse is applied to the receiver latch thereby causing the output level to drop to ground level where it will remain until another positive pulse is received. The data wave form 43 is applied to I/O device 1; the I/O device can be any terminal, tape drive, etc. The information, if not designated for the I/O device, is connected back to the wrap control unit 36 as shown via line 38. However, if this signal data is designated for input/output device 1 the information is operated on, or it may be that this information is replaced by new information which is sent via line 38 to the wrap control unit 36. The details of the wrap control unit 36 will be discussed in connection with FIG. 6. The wrap control unit routes the data received thereby to a driver D1 which amplifies and shapes the information to be connected to the transmission line or wire traveling in the same clockwise direction as the information received by the repeater. The output of the driver D1 is shown in FIG. 4 as wave form 44. Actually wave form 43 and wave form 44 are essentially the same except for the delay in going through the wrap control unit and driver. The data signals represented by wave form 44 are applied to the directional coupler 31 going in the direction indicated by the arrow on the connecting line 50. The other end of the first element 51 of the directional coupler 31 has a resistor 52 which is connected to ground and is of sufficient resistance to provide an impedance equal to the characteristic impedance of the transmission line 20 so that any signals propagating in that direction along the element 51 of directional coupler 31 will be essentially terminated. The signals coupled through directional coupler 31 onto the wire 20 travel in the opposite direction because of the directionality of the directional coupler. Thus, the coupled output is traveling on the wire 20 in the clockwise direction as shown with a wave form similar to that shown in wave form 45. It can be seen that the coupler produces an attenuated wave form because of the losses taking place in the coupling. There is a signal placed on wire 20 going in the undesired direction, that is, toward receiver R2. However this signal is relatively small and is terminated in resistor 53.

The directional coupler, shown schematically in FIG. 3, is of the strip line variety which has two conductive segments extending parallel to one another. Generally, strip line type conductors are mounted on a substrate made of a non-conductive material such as epoxy glass and are arranged between two ground planes which usually consist of sheets of copper arranged over and under the conductors. One conductive segment of the directional coupler forms part of the main transmission line while the other conductive segment has one end connected to the branch transmission line and the other end terminated by a terminating resistor. The coupling takes place along the length of the conductive segments. The coupler operation depends upon the steepness of the incident pulse rise and fall time. The width or duration of the pulse produced by the coupling is determined by the length of the two segments in parallel and the rise time of the incident pulse. The performance of the coupler is related to the impedances offered to signals on the transmission line and the coupling ratio, which are determined by the widths of the lines in the coupled region, the thickness of the lines, the distance between ground planes and the relative dielectric constant of the material used. The coupled pulse travels in the opposite direction in the second conductive segment to the direction of travel in the first conductive segment, which in this case, forms part of the transmission line. A strip line coupler is operated by the edge of the wave passing along one of the lines and this wave edge should have a rise or fall time that is equal to or greater than two times the electrical length of the coupled region in order that the relationship of the height of the induced pulse be related to the height of the drive pulse in the manner defined by the coupling ratio. The wave forms generated as a result of the coupling of directional coupler 31 is shown in wave form 45 of FIG. 4.

The operation of the regenerative repeater 26 on the counter-clockwise data is exactly the same as that applied to the clockwise data. The counter-clockwise data is received in receiver R2 and sent to the input/output device 2. The resulting information from input/output device 2 is sent to the wrap control unit 36 via line 57 where it is routed to driver D2 and placed onto the wire going in the counter-clockwise direction by directional coupler 32. It will be appreciated that the clockwise data is received, sent to input/output 1 and applied to the driver D1 from whence it is placed back on the wire going in the clockwise direction. The procedure set forth above takes place for the counter-clockwise data. The wave forms 41a through 45a shown in FIG. 4 are the mirror image of the wave forms 41 through 45. These wave forms 41a–45a are associated with the counter-clockwise data. It will be appreciated that the regenerative repeater is capable of handling information signals from both directions simultaneously, and placing such signals after handling back onto the single wire going in opposite directions. The key factor in the ability of the regenerative repeater 26 to handle information going in both directions is the directional couplers 31 and 32 which have the ability to differentiate between two signals of equal amplitude and equal frequency propagating in opposite directions. This repeater 26 is able to double the data handling capacity because of the use of two I/O devices, one associated with the information going in one of the directions and the other associated with the data going in the opposite direction on the same wire.

Figure 5:
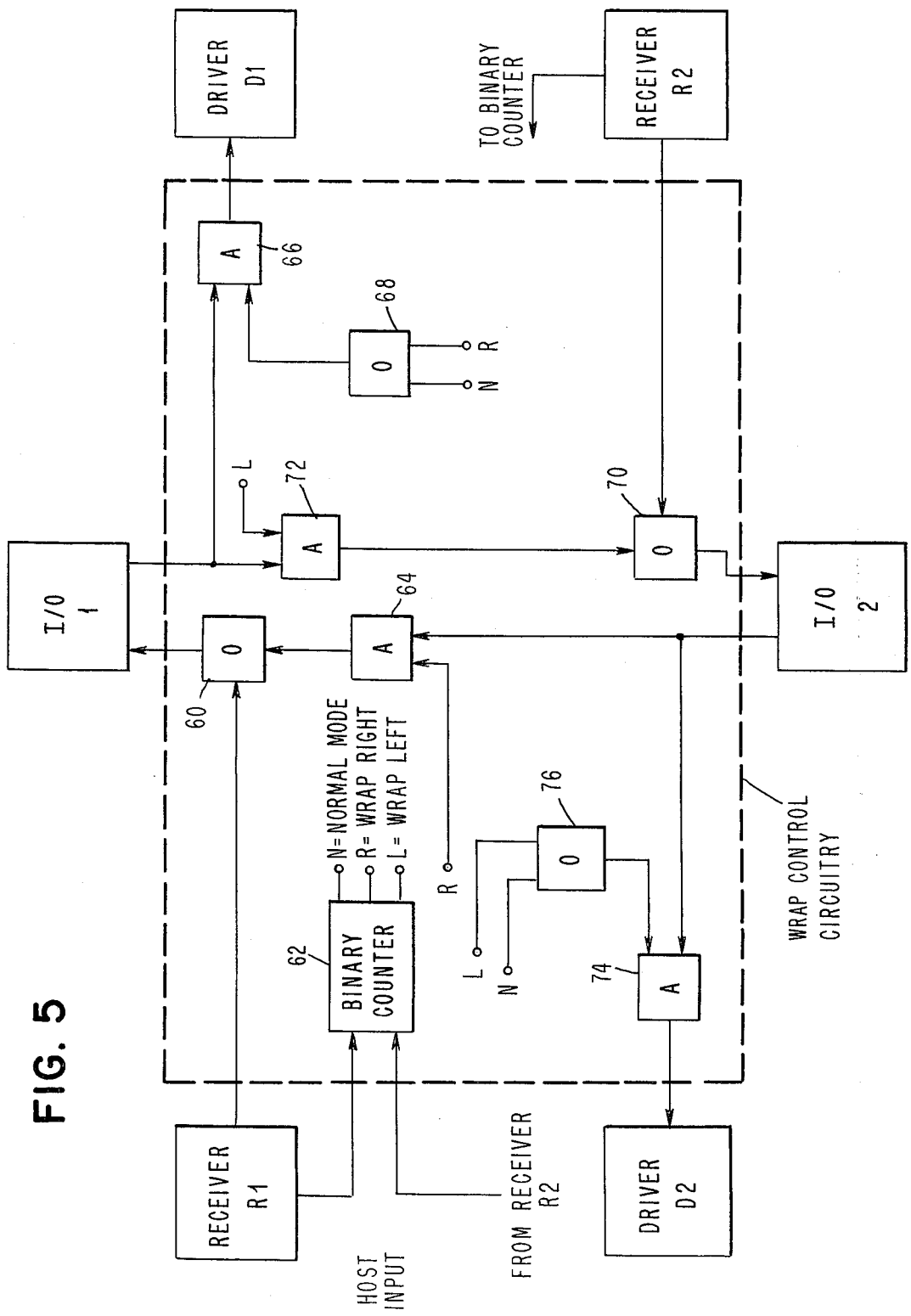
FIG. 5 is a logic diagram showing the wrap control function of the wrap control unit shown in FIG. 3.

Referring to FIG. 5, there are shown more details of the wrap control function. Wrap control in this embodiment has three possible modes of operation. Wrap right R., wrap left L and normal mode N which is actually no wrap. In order to understand the wrap control unit, the function of wrap control needs to be understood. The host unit determines where there is a break in the line by successively signaling the different I/O devices that an answer is required. For example, assume that there is a break in the line 20 between the second and the third input/output device 24b, 24c in FIG. 2. The host unit 22 will signal I/O 24a to wrap left, and subsequently the host will receive a confirmation from I/O 24a. The hose will then signal I/O 24a to operate in the normal mode. Subsequently, the host will signal I/O 24b to wrap left and the host will receive confirmation. The host will then signal I/O 24b to operate in the normal mode. The host then signals I/O 24c to wrap left. Since we have assumed that the break is between I/O 24b and 24c, there will be no confirmation signal received from I/O 24c. Therefore, the host signals I/O 24b to wrap left again. The host then signals 24c in the counterclockwise direction to wrap right. The host, if it receives confirmation from I/O 24c, leaves I/O 24c in the wrap right mode. Obviously, this indicates that the break is between I/O 24b and I/O 24c.

The details of the wrap control unit are shown in FIG. 5. Assume the unit is in the normal mode with the input data signals received at receiver R1 traveling in the clockwise direction. The information is connected from receiver R1 to OR circuit 60. It should be noted that the receiver R1 receives information from the host unit 22 which puts the binary counter 62 into the normal mode N. The OR circuit 60 passes the information to the I/O device 1, since it receives information signals from receiver R1 and no input signals from the AND circuit 64. The information from I/O 1 is sent to AND circuit 66. The AND circuit 66 passes the information since it also receives input signals from OR circuit 68 which signals are generated from the OR circuit by virtue of the fact that the N input thereto produces the signals. The output from AND circuit 66 goes to driver D1 from whence it is connected to wire 20. Thus in the normal mode, the clockwise information is received by receiver R1, sent to the I/O device and put back onto the line by driver D1. Similarly, the information received in the counterclockwise direction by receiver R2, when the operation is in the normal mode N, is inputted to OR device 70 which passes the information to I/O 2, since this is the only input to OR circuit 70. The AND circuit 72 produces output signals which are connected to OR circuit 70 only when the wrap control unit is in the wrap left L mode. The input/output device 2 sends information to AND circuit 74, which is energized by the simultaneous reception of this information and the output signals from OR circuit 76. OR circuit 76 produces output signals by virtue of the fact that N (normal mode) signal only is received thereby. The output information from AND circuit 74 is connected to driver D2 for subsequent placement back onto the wire 20. In the normal operation N, the information is received from and placed onto the wire by its respective receiver and driver.

Now, considering the case where the host unit information sent to the binary counter 62 indicates a wrap left function L, the information is similarly passed through OR circuit 60 to I/O 1, since the AND circuit 64 produces no output by virtue of the fact that it has as one of its inputs the wrap right function R. The information from I/O 1 does not produce an output. The OR circuit 68 produces no output since the L function is not an input thereto. Accordingly, the information is not passed to driver D1 as it was in the normal mode. The information from I/O 1 goes through AND circuit 72 and OR circuit 70. OR circuit 70 passes the information to I/O 2 since there are no other input signals to the OR circuit when it is in the wrap left mode of operation. I/O 2 sends the information to AND circuit 74 which is operative to pass the information, since the L input for OR circuit 76 produces an output therefrom which is received in AND circuit 74 to gate the information from I/O 2. The AND circuit 74 gates the information to driver D2 so that the information can be placed back onto the same wire from which it was received. It can be seen that this is the wrap left function.

The wrap right function is similarly obtained by virtue of receiver R2 and driver D1. For example, the information wrap right R is received in the binary counter from receiver R2 putting a wrap right R output into the wrap control unit. In the wrap right operation, receiver R2 receives the inforamtion from the host unit 22 in the counter-clockwise direction and applies it to OR circuit 70 which gates the information onto I/O 2. There is no input from AND circuit 72 by virtue of the fact that it is energized by the wrap left L function. The information from I/O 2 is gated through AND circuit 64 since it receives an input from the R output of the binary counter 62. The information from the AND circuit 64 passes through the OR circuit 60 by virtue of the fact that there is no inut to OR circuit 60 from receiver R1 in the wrap right function. The information goes to I/O 1. The output information from I/O 1 is gated through AND circuit 66 which simultaneously receives a signal from OR circuit 68 by virtue of the fact that it is energized by a wrap right R input from counter 62. The information passed by AND circuit 66 goes to driver D1 and is subsequently placed onto the wire 20 going in the opposite direction to the received information. It can be seen that the wrap control unit is a logic circuit arrangement which provides the ability to route the information back onto the same cable it is received from if that wrap operation is called for.

In summary, a data transmission system has been described and shown which effectively doubles the data handling capacity of the prior art system by providing directional couplers which allow the information to be placed on a cable going in the opposite direction to information being received on the cable without substantial signal interference. The arrangement also provides a wrap control function in which the information can again be simultaneously transmitted in opposite directions on a single wire.

While the invention has been particularly shown and described with reference to preferred embodiment thereof, it will be understood by those skilled in the art that the various changes in form and detail may be made therein without departing from the spirit and scope of the invention.

What is claimed is:

1. In a data communications system having a host unit and a plurality of terminals connected to a single transmission wire;

means at said host unit for placing data on the transmission wire traveling in opposite directions;

a plurality of repeater means each interfacing a pair of said terminals with said transmission wire for receiving and regenerating data from either direction, distributing said data to at least one of said pair of terminals and coupling data from said terminals to said transmission wire;

said repeater means including a first directional coupler for coupling data signals from the repeater means to said transmission wire in the one direction without interfering with the data traveling on the wire in the opposite direction and a second directional coupler for coupling data signals from the repeater means to said transmission wire in the other direction without interfering with data signals traveling on the wire in the opposite direction whereby the data signals can be conveyed via the same communication wire in opposite directions simultaneously, thereby doubling the data handling capacity of the communications system.

2. In a data communications system according to claim 1, wherein said transmission wire is formed into a loop starting and ending at said host unit.

3. In a data communications system according to claim 1, wherein said means for placing data signals onto said transmission wire in opposite directions consists of one unit for placing data signals onto one end of the transmission wire traveling toward the other end and a second unit for placing data signals onto the other end of said transmission wire traveling towards said one end.

4. In a data communications systems according to claim 1, wherein said means for placing data on said transmission wire traveling in opposite directions includes means for placing data on said transmission wire of different data rates traveling in opposite directions.

5. A system according to claim 1, wherein said first and second directional couplers are each of a predetermined size and have a predetermined coupling co-efficient so as to maximize the coupling of the data in accordance with its frequency.

6. Apparatus according to claim 1, wherein said repeater means includes a wrap control unit which when energized routes the received data signals to both said pair of terminals and routes the data signals received from said terminals back onto said transmission wire in the opposite direction from the received data signals via the respective first and second directional coupler.

7. In a data communications system according to claim 6, wherein said wrap control unit includes a combination of AND and OR logic circuits for routing the data signals in accordance with the received mode of operation from the host unit.

8. In a data communications system according to claim 7, wherein said combination of AND and OR logic circuits for routing the data signals are controlled to operate in the normal N mode to route the data signals from the transmission wire to the associated input/output device and back to the transmission wire traveling in the same direction.

9. In a data communications system according to claim 7, wherein said combination of AND and OR logic circuits for routing the data signals are controlled to operate in the wrap right mode (R) or the wrap left mode (L) to route the data signals from the transmission wire to the associated input/output device and back to the transmission wire traveling in the opposite direction to the received data.

* * * * *